Jan. 28, 1947. J. H. FREIS 2,414,941
COLLAPSIBLE GOLF BAG CARRIER
Filed Oct. 29, 1945 2 Sheets—Sheet 1

INVENTOR.
James H. Freis
BY
His Attorney.

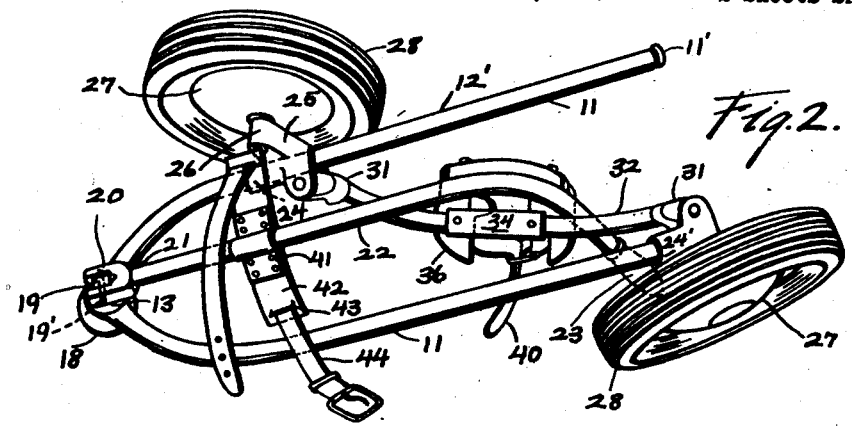

Patented Jan. 28, 1947

2,414,941

UNITED STATES PATENT OFFICE 2,414,941

COLLAPSIBLE GOLF BAG CARRIER

James H. Freis, Chicago, Ill.

Application October 29, 1945, Serial No. 625,359

7 Claims. (Cl. 280—42)

This invention relates to a collapsible golf bag carrier. It has for one of its objects to provide a carrier of the character hereinafter more fully set forth which may be collapsed into a compact parcel of a size adapted to occupy the minimum space when not in use and when placed in a vehicle trunk or the like.

Another object of the invention is to provide a collapsible golf bag carrier which by a simple operation of a latching mechanism, may conveniently and readily be collapsed into a compact parcel of a minimum size.

Another and equally important object of the invention is the provision of a collapsible golf bag carrier which may be extended to golf bag carrying position in an easy manner, requiring for such purpose the minimum effort upon the part of the user.

A still further and equally important object of the invention is the provision of a collapsible golf bag carrier which is of a simple structure, highly efficient in use, and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 2 is a perspective view of the same showing the invention in a collapsed position;

Fig. 3 is a sectional detail view of the same taken substantially on line 3—3 of Fig. 1;

Fig. 4 is a fragmentary sectional detail view of a latch structure embodied in the invention; and Fig. 5 is a fragmentary detail view taken substantially on line 5—5 of Fig. 1.

Figure 1:
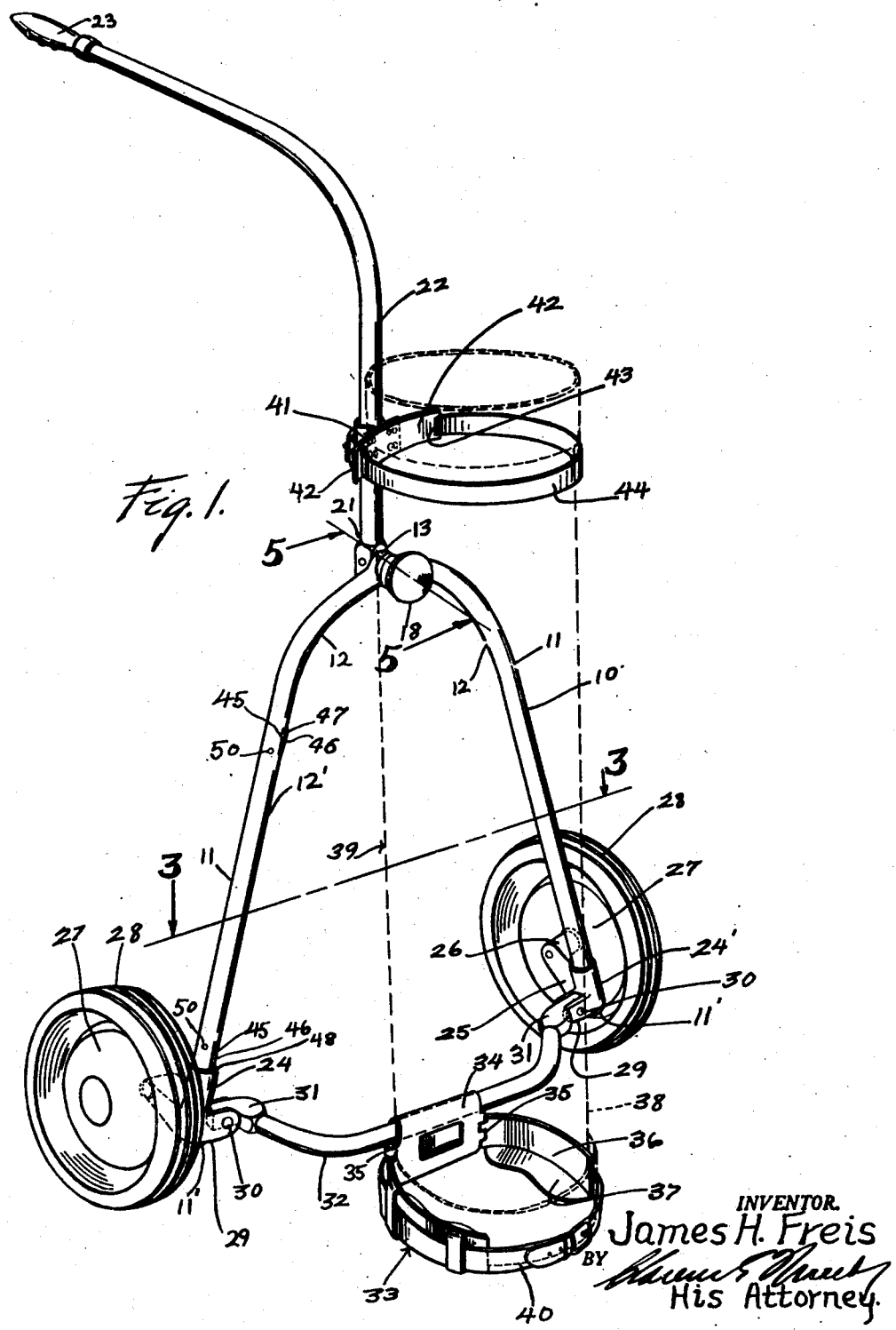
Fig. 1 is a perspective view of the golf bag carrier embodying my invention showing the same in distended position.

An object of the invention is the provision of a golf bag carrier of a collapsible construction which, when in distended position, will rigidly and securely support a golf bag and the contents thereof for conveyance about a golf course, and, when in a collapsed condition, will permit the same to be placed in the trunk of a vehicle or the like.

The drawings illustrate the preferred form of construction by which the objects of the invention are accomplished. In this connection, my improved collapsible golf bag carrier comprises a frame 10 including side bars 11 curved inwardly toward each other as at 12, with their flattened end portions 13 disposed in overlapping relation with respect to each other and perforated as at 14 for the passage of the shank 15 of a screw 16. This screw 16 is threaded into a socket 17 formed in a hand wheel or disc 18. The shank 15 (Fig. 5) has a head portion 19 secured as at 19' between the bifurcated head 20 provided as at 21 to one end portion of a handle 22. This handle 22 has a curved formation (as shown in Fig. 1) and is provided with a hand hold element 23, the curved portion of the handle 22 being for the reasons hereinafter more fully set forth. By tightening the hand wheel or disc 18 upon the threaded shank, the handle will be rigidly latched in a distended position with respect to the side bars 11, as shown in Fig. 1.

The lower end portions of these side bars 11 are secured in socket bearing elements 24 and 24', the socket bearing element 24 being slidable longitudinally with respect to the side bar 11 with which it is associated, and the end portions of these side bars 11 are provided with enlarged heads 11' which engage the socket bearing elements 24 and 24'. These socket bearing elements are formed as an integral part of mounting brackets 25 having end portions 26 rotatably carrying wheel elements 27 in any suitable manner, the wheel elements 27 being preferably provided with rubber treads 28. These mounting brackets 25 have perforated lugs 29 into which are pivotally secured as at 30 the bearings 31 of a transverse bar 32. This bar 32 carries a golf bag support 33 which may be of any approved construction, substantially pan-shaped in plan view. For the purpose of illustration, I have shown this golf bag support as comprising a plate 34 carried by the crossbar 32 and having hinged thereto, as at 35, side plates 36 provided with horizontally inwardly turned supporting flanges 37 upon which the bottom 38 of the golf bag 39 is supported and secured between the plates 36 by a suitable strap 40. On the handle 22 is a bracket 41 having side wings 42 perforated as at 43 for the passage of a strap 44, which strap 44 encircles the upper end portion of the golf bag to securely connect the golf bag to the handle 22.

The golf bag carrier embodying my invention in Fig. 1 is illustrated in its distended position, and it is intended that the handle 22 have a curvature which will afford easy handling by the user and will dispose as much of the weight of the golf bag as possible upon the plates 36, thereby to assure the maximum comfort to the user during manipulation of the carrier in moving the bag about. When not moving the bag about, the carrier is tilted backward so that the weight of the carrier is disposed upon the plates 36, in which position the plates 36 comprise the third point of support in cooperation with the wheels 27, which provide the other two means of support.

When the carrier is to be stored away or placed in the trunk of a vehicle or the like, the golf bag is removed therefrom. The hand wheel or disc 18 is rotated to loosen the wedging connection between the flattened portions 13 of the side bars 11 and the head 19. This permits the handle 22 to be pivoted down between the side bars 11, as shown in Fig. 2, and by moving the socket bearing element 24 longitudinally of the side bar 11 with which it is associated, the side bars 11 may be collapsed toward each other and the crossbar 32 disposed in the position shown in Fig. 2, to permit these side bars 11 to be collapsed a maximum distance toward each other. When collapsed the carrier will take the position as shown in Fig. 2, in which position the carrier, as a parcel, may be placed away for storage or be carried about in the trunk of a vehicle. In this collapsed position, as shown in Fig. 2, the golf bag supporting plates 36 are pivoted to occupy the minimum space, their position being more clearly shown in Fig. 2 when the carrier is collapsed.

It may be desirable to latch the carrier in collapsed as well as distended position, and for this purpose any approved latching means may be employed.

For a clear understanding of the invention, I have illustrated one form of latching means. In this connection one of the side bars 11, for example, that one indicated at 12', is provided with spaced elongated openings 45, and projecting through each of these openings 45 is a latch plate 46 having a latch end 47. This latch end 47, if it be the lower of the plates 46, is adapted to engage the edge 48 of the socket bearing element 24 and thereby latch the side bars 11 in collapsed position. Each of the latch plates 46 is pivotally carried as at 50 to a plug 51 arranged within the side bar 12', and these latch plates 46 are each held in projected position by means of a suitable spring leaf 52, as best shown in Fig. 4.

From the foregoing description, it will be apparent that I have provided a collapsible golf bag carrier which may be collapsed to a small compact parcel by a simple operation, with the minimum effort upon the part of the user; that it may be moved to distended position likewise by a simple operation requiring the minimum effort upon the part of the user. When collapsed the carrier will occupy a minimum space when stored away, for example, in the trunk of a vehicle or the like. When in distended position, the user may with comfort and ease convey the golf bag about the course.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, and means for supporting a golf bag from said handle and from said crossbar.

2. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, and means carried by said crossbar for supporting a golf bag.

3. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, and means for detachably connecting a golf bag to said handle.

4. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, means for detachably connecting the upper end portion of a golf bag to said handle, and means carried by the crossbar providing a support for the lower end portion of said golf bag.

5. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, and means for supporting a golf bag from said handle and from said crossbar, said handle having a portion of its length curved in a direction away from said frame.

6. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, and means carried by said crossbar for supporting a golf bag, said handle having a portion of its length curved in a direction away from said frame.

7. A collapsible golf bag carrier comprising a frame including side bars, the upper end portions of which are curved inwardly toward each other with their extremities disposed in overlapping position with respect to each other, mounting brackets having socket elements with one of said socket elements secured to one end portion of one of said side bars and the other of the socket elements mounted for longitudinal movement with respect to the other of the side bars, wheel elements carried by said mounting brackets, a crossbar, means for pivotally connecting the opposite end portions of the crossbar to said mounting brackets, latch means for releasably latching said other of the socket elements in either of two positions with respect to the side bar upon which said other of the socket elements is slidably mounted, a handle, means for pivotally connecting the handle to the frame adjacent the overlapping portions of said side bars, and means for detachably connecting a golf bag to said handle, said handle having a portion of its length curved in a direction away from said frame.

JAMES H. FREIS.